(12) United States Patent
Gardner et al.

(10) Patent No.: US 8,142,756 B1
(45) Date of Patent: Mar. 27, 2012

(54) METHODS OF REFORMING HYDROCARBON FUELS USING HEXAALUMINATE CATALYSTS

(75) Inventors: Todd H. Gardner, Morgantown, WV (US); David A. Berry, Morgantown, WV (US); Dushyant Shekhawat, Morgantown, WV (US)

(73) Assignee: The United States of America as represented by the U.S. Department of Energy, Washington, DC (US)

( * ) Notice: Subject to any disclaimer, the term of this patent is extended or adjusted under 35 U.S.C. 154(b) by 0 days.

(21) Appl. No.: 12/717,372

(22) Filed: Mar. 4, 2010

Related U.S. Application Data

(62) Division of application No. 11/390,216, filed on Mar. 28, 2006, now abandoned.

(51) Int. Cl.
*C01B 3/26* (2006.01)
(52) U.S. Cl. ......... 423/651; 252/373; 423/652; 423/654
(58) Field of Classification Search .................. 423/650, 423/651, 652, 653, 654; 252/373
See application file for complete search history.

(56) References Cited

U.S. PATENT DOCUMENTS

| | | | |
|---|---|---|---|
| 7,888,278 B2* | 2/2011 | Rapier et al. | 501/152 |
| 8,105,973 B2* | 1/2012 | Basile et al. | 502/252 |
| 2005/0232857 A1* | 10/2005 | Lomax et al. | 423/652 |
| 2005/0265920 A1* | 12/2005 | Ercan et al. | 423/651 |

* cited by examiner

*Primary Examiner* — Wayne Langel
(74) *Attorney, Agent, or Firm* — James B. Potts; Mark P. Dvorscak; John T. Lucas

(57) ABSTRACT

A metal substituted hexaaluminate catalyst for reforming hydrocarbon fuels to synthesis gas of the general formula $AB_yAl_{12-y}O_{19-\delta}$, A being selected from alkali metals, alkaline earth metals and lanthanide metals or mixtures thereof. A dopant or surface modifier selected from a transitions metal, a spinel of an oxygen-ion conductor is incorporated. The dopant may be Ca, Cs, K, La, Sr, Ba, Li, Mg, Ce, Co, Fe, Ir, Rh, Ni, Ru, Cu, Pe, Os, Pd, Cr, Mn, W, Re, Sn, Gd, V, Ti, Ag, Au, and mixtures thereof. The oxygen-ion conductor may be a perovskite selected from M'RhO$_3$, M'PtO$_3$, M'PdO$_3$, M'IrO$_3$, M'RuO$_3$ wherein M'=Mg, Sr, Ba, La, Ca; a spinel selected from MRh$_2$O$_4$, MPt$_2$O$_4$, MPd$_2$O$_4$, MIr$_2$O$_4$, MRu$_2$O$_4$ wherein M=Mg, Sr, Ba, La, Ca and mixtures thereof; a florite is selected from M"O$_2$.

3 Claims, 8 Drawing Sheets

8,142,756 B1

METHODS OF REFORMING HYDROCARBON FUELS USING HEXAALUMINATE CATALYSTS

CROSS REFERENCE TO RELATED APPLICATIONS

This application is a divisional of and claims the benefit of U.S. application Ser. No. 11/390,216 filed on Mar. 28, 2006 now abandoned by instant inventors, which is hereby incorporated by reference in its entirety.

The United States Government has rights in this invention pursuant to Agreement between National Energy Technology Laboratory and pursuant to the employer-employee relationship of the U.S. Department of Energy and the inventors.

FIELD OF THE INVENTION

The present invention relates to catalyst deactivation by carbon deposition.

BACKGROUND OF THE INVENTION

Catalyst deactivation due to carbon formation is one of the most difficult challenges in the design of catalysts for the reforming of hydrocarbon fuels. Carbon deposits decrease catalyst activity by blocking active sites, causing attrition of catalyst particles and results in increasing pressure drop and ultimately discontinuation of the process.

The formation of carbon on the catalyst initiates either by reaction of the hydrocarbon on the active metallic surface or by cracking on the support material. Carbon formation on metallic surfaces is a structure sensitive reaction that preferentially initiates on the step edges of the metal crystallites. While step edges are more reactive toward C—C and C—H bond scission, their surface geometry results in highly coordinated sites (a greater number of next-nearest-neighbors) that facilitate the multipoint adsorption of heavy hydrocarbon molecules and the formation of carbon. By dispersing the active metals in a mixed-metal oxide that has a strong metal-support interaction; such as hexaalumina, the active metals are maintained in a state of low coordination, with few contiguous clusters; thereby, disrupting the carbon formation mechanism. Ensembles, or groups of active sites, are also nucleation sites for carbon growth. By dispersing the active metal crystallites, the nucleation sites are eliminated minimizing carbon deposition. In this invention, transition metals are doped directly into the structure of hexaalumina, a high temperature refractory support material. The hexaalumina serves to not only disperse the active metal crystallites, but also creates a strong metal-support interaction that prevents these crystallites from aggregating, sintering and vaporizing.

SUMMARY OF THE INVENTION

It is a principal object of the present invention to provide a catalyst, a method of making same and method of using the catalyst which retains its usefulness over a long period of time in the presence of hydrocarbon fuels that normally cause a reduction in catalyst deficiency due to coping sulfur poisoning.

It is another object of the present invention to a metal substituted hexaaluminate catalyst for reforming hydrocarbon fuels to synthesis gas, comprising a hexaaluminate of the general formula $AB_yAl_{12-y}O_{19-\delta}$, wherein A is selected from the alkali metals, the alkaline earth metals, the lanthanide metals or combinations thereof, B is selected from the transition metals or mixtures thereof, and a dopant or a surface modifier selected from a transition metal or a spinel or an oxygen-ion conductor and mixtures thereof, wherein the dopant is selected from Ca, Cs, K, La, Sr, Ba, Li, Mg, Ce, Co, Fe, Ir, Rh, Ni, Ru, Cu, Pe, Os, Pd, Cr, Mn, W, Re, Sn, Gd, V, Ti, Ag, Au and mixtures thereof, the spinel contains a dopant metal, and wherein if Ni is present as a dopant without a spinel or an oxygen-ion conductor Ni is present in a concentration of greater than 2.3% by weight and less than 4.4% by weight of the catalyst.

Another object of the present invention is to provide a metal substituted hexaaluminate catalyst for reforming hydrocarbon fuels to synthesis gas, comprising a hexaaluminate of the general formula $AB_yAl_{12-y}O_{19-*}$, wherein A is selected from the Li, K, Ca, Ba, Sr, La, Ce and combinations thereof, B is selected from the Ni, Rh, Mn, Pd, Cu, Pt or combinations thereof, and a dopant or a surface deposit of a spinel or a perovskite or an oxygen-ion conducting fluorite or mixtures thereof, wherein the dopant is selected from K, Ca, Ba, Sr, La, Ce, Ni, Rh, Mn, Pd, Cu, Pt, Co, Ru, and mixtures thereof, the spinel is selected from $MRh_2O_4$, $MPt_2O_4$, $MPd_2O_4$, $MIr_2O_4$, $MRu_2O_4$ wherein M'=Mg, Sr, Ba, La, Ca and mixtures thereof, the perovskite is selected from $M'RhO_3$, $M'PtO_3$, $M'PdO_3$, $M'IrO_3$ $M'RuO_3$ wherein M'=Mg, Sr, Ba, La, Ca and mixtures thereof, the oxygen-ion conducting fluorite is selected from $M''O_2$ wherein M'' is M, M' or mixtures thereof, and wherein if Ni is present alone as a dopant without a spinel or a perovskite or fluorite Ni is present in a concentration of greater than 2.3% by weight and less than 4.4% by weight of the catalyst.

A further object of the invention is to provide a method of reforming a fuel containing hydrocarbons to produce a synthesis gas, comprising contacting the hydrocarbon containing fuel under reforming conditions with a catalyst of a hexaaluminate of the general formula $AB_yAl_{12-y}O_{19-\delta}$, wherein A is selected from the alkali metals, the alkaline earth metals, the lanthanide metals or combinations thereof, wherein A is selected from the alkali metals, the alkaline earth metals, the lanthanide metals or combinations thereof, B is selected from the transition metals or mixtures thereof, and a dopant or a surface modifier selected from a transition metal or a spinel or an oxygen-ion conductor and mixtures thereof, wherein the dopant is selected from Ca, Cs, K, La, Sr, Ba, Li, Mg, Ce, Co, Fe, Ir, Rh, Ni, Ru, Cu, Pt, Os, Pd, Cr, Mn, W, Re, Sn, Gd, V, Ti, Ag, Au and mixtures thereof, the spinel is selected from $MRh_2O_4$, $MPt_2O_4$, $MPd_2O_4$, $MIr_2O_4$, $MRu_2O_4$ wherein M=Mg, Sr, Ba, La, Ca and mixtures thereof, the perovskite is selected from $M'RhO_3$, $M'PtO_3$, $M'PdO_3$, $M'IrO_3$ $M'RuO_3$ wherein M'=Mg, Sr, Ba, La, Ca and mixtures thereof, said oxygen-ion conducting fluorite is selected from $M''O_2$ wherein M'' is M, M' or mixtures thereof, and wherein if Ni is present alone as a dopant without a spinel or a perovskite or fluorite Ni is present in a concentration of greater than 2.3% by weight and less than 4.4% by weight of the catalyst, whereby to convert at least a portion of the hydrocarbon containing fuel to hydrogen and carbon monoxide.

A final object of the present invention is to provide a method of preparing a metal substituted hexaaluminate catalyst for reforming hydrocarbon fuels to synthesis gas, the hexaaluminate being of the general formula $AB_yAl_{12-y}O_{19-\delta}$, wherein A is selected from the alkali metals, the alkaline earth metals, the lanthanide metals or combinations thereof, B is selected from the transition metals or combinations thereof, and a dopant or a surface deposit of a spinel or a perovskite or mixtures thereof, wherein the dopant is selected from Ca, Cs, K, La, Sr, Ba, Li, Mg, Ce, Co, Fe, Ir, Rh, Ni, Ru, Cu, Pt, Os, Pd, Cr, Mn, W, Re, Sn, Gd, V, Ti, Ag, Au and mixtures thereof, the spinel is selected from $MRh_2O_4$, $MPt_2O_4$, $MPd_2O_4$, $MIr_2O_4$, $MRu_2O_4$ wherein M=Mg, Sr, Ba, La, Ca and mixtures thereof, the perovskite is selected from $M'RhO_3$, $M'PtO_3$, $M'PdO_3$, $M'IrO_3$ $M'RuO_3$ wherein M'=Mg, Sr, Ba, La, Ca and mixtures thereof, the oxygen-ion conducting fluorite is selected from $M''O_2$ wherein M'' is M, M' or mixtures thereof, and wherein if Ni is present alone as a dopant without a spinel or a perovskite or fluorite Ni is present in a concentration of greater than 2.3% by weight and less than 4.4% by weight of the catalyst, the method comprising forming an aqueous nitrate solution of the catalyst constituents containing Al ions in an acidic environment, adjusting the acidic environment to a pH sufficient to precipitate the constituents, filtering and rinsing the precipitated constituents to remove extraneous liquid and thereafter calcining the precipitate for a time and at a temperature sufficient to produce the catalyst or forming a metallo-isopropoxide of the desired constituents and adding same to water followed by rinsing and drying to form a cake and calcining the cake at a temperature and for a time sufficient to form the catalyst or forming a mixture of the constituent oxides followed by addition of water followed by drying and calcining oxides at a temperature and for a time sufficient to form the catalyst.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
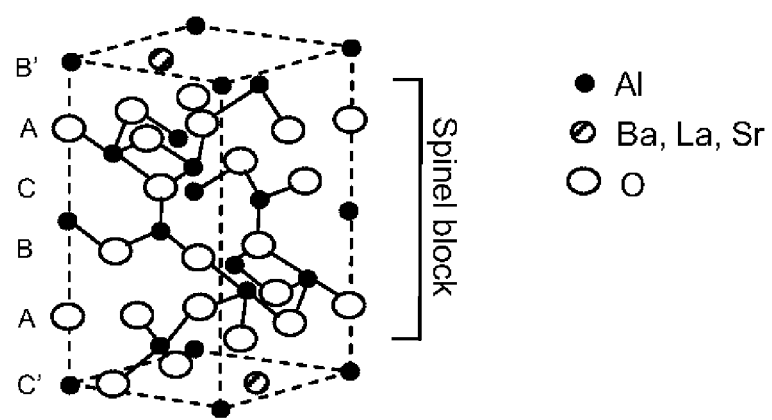
FIG. 1 is a representation of the crystal structure of a hexaaluminate catalyst having the general formula of $AB_yAl_{12-y}O_{19.5-\delta}$.

Hydrocarbon fuels that can be reformed with this invention include: middle distillate (diesel fuel), gasoline, natural gas, methane, ethanol, methanol, diethyl ether, military logistic fuels (JP-8, JP-5, NATO-F76, etc.), kerosene, naptha, bunker fuel, petroleum process residual fuels (petroleum residue and others).

The following active metals and their combinations are useful in reforming hydrocarbons and can be doped directly into the structure of hexaalumina:

Ca, Cs, K, La, Sr, Ba, Li, Mg, Ce, Co, Fe, Ir, Rh, Ni, Ru, Cu, Pe, Os, Pd, Cr, Mn, W, Re, Sn, Gd, V, Ti, Ag, Au. The hexaaluminate catalysts are catalytically active as catalysts in steam reforming (SR), autothermal reforming (ATR) and partial oxidation (PDX) reforming of hydrocarbon fuels to synthesis gas. These reforming reactions are expressed as follows:

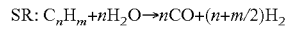
SR: $C_nH_m+nH_2O \rightarrow nCO+(n+m/2)H_2$

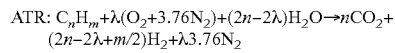
ATR: $C_nH_m+\lambda(O_2+3.76N_2)+(2n-2\lambda)H_2O \rightarrow nCO_2+(2n-2\lambda+m/2)H_2+\lambda 3.76N_2$

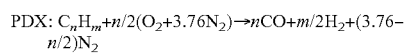
PDX: $C_nH_m+n/2(O_2+3.76N_2) \rightarrow nCO+m/2H_2+(3.76-n/2)N_2$

Where $\lambda$ is the molar air-to-fuel ratio.

Strong metal-support interactions are also achieved by forming perovskite and/or spinel layers and/or fluorite layers on the surface of hexaalumina. In this regard, hexaalumina functions as a support that provides the necessary thermal stability, while the perovskite and/or spinel over layer provides the strong metal-support interaction. Examples of spinel formulations include: $MRh_2O_4$/Ba-hexaaluminate, $MPt_2O_4$/Ba-hexaaluminate, $MPd_2O_4$/Ba-hexaaluminate, and $MIr_2O_4$/Ba-hexaaluminate, wherein M is selected from $MRh_2O_4$, $MPt_2O_4$, $MPd_2O_4$, $MIr_2O_4$, $MRu_2O_4$ wherein M=Mg, Sr, Ba, La, Ca and mixtures thereof. Examples of perovskite formulations include $M'RhO_3$/Ba-hexaaluminate, $M'PtO_3$/Ba-hexaaluminate, $La_{0.5}Ba_{0.5}PdO_3$/Ba-hexaaluminate, and $MIrO_3$/Ba-hexaaluminate, the perovskite is selected from $M'RhO_3$, $M'PtO_3$, $M'PdO_3$, $M'IrO_3$ $M'RuO_3$ wherein M'=Mg, Sr, Ba, La, Ca and mixtures thereof. Examples of oxygen-ion conducting fluorite are $M'O_2$, where M'' is defined above and includes M and M'. The oxygen-ion conducting fluorite is selected from $M''O_2$ wherein M'' is M, M' or mixtures thereof, and wherein if Ni is present alone as a dopant without a spinel or a perovskite or fluorite Ni is present in a concentration of greater than 2.3% by weight and less than 4.4% by weight of said catalyst.

In general, lanthanum (La), magnesium (Mg), barium (Ba) lanthanum (La), calcium (Ca), and strontium (Sr) may be utilized to achieve the necessary thermal stability, basicity and spatial separation of active metal components as fluorite, spinels or perovskites, although only Ba was listed above.

In addition, strong metal support interactions are also achieved by depositing transition metals on the surface of hexaaluminate metal components of the hexaaluminate structure, the most preferred of which include: rhodium (Rh), palladium (Pd), platinum (Pt), iridium (Ir), nickel (Ni), cobalt (Co), ruthenium (Ru), copper (Cu) and osmium (Os) and their combinations. These hexaaluminate-type catalysts are also catalytically active as catalysts in steam reforming, autothermal reforming and partial oxidation reforming of hydrocarbon fuels to synthesis gas. Active metals supported in this manner also are less prone to aggregation, sintering and vaporization.

Another significant cause of carbon formation on hydrocarbon reforming catalysts is excessive cracking of the hydrocarbon feed on the support. This can be avoided through tailoring the acidity of hexaalumina by the introduction of basic elements including: magnesium, barium, strontium, lanthanum, cerium and calcium. The presence of alkali Li, Na, K and Ca will also strongly adsorb carbon dioxide and water to the surface of the catalyst, facilitating the gasification of carbon deposits.

The facilitated gasification of carbon deposits from the surface of hexaalumina-type catalysts may also be achieved by the application of thin films of spinels and/or oxygen-ion conducting materials, such as perovskites or fluorites, in general, to the surface of hexaaluminate-type catalysts. Generally, the preferred spinels, perovskites and fluorites are selected from M'RhO$_3$, M'PtO$_3$, M'PdO$_3$, M'IrO$_3$ M'RuO$_3$ wherein M'=Mg, Sr, Ba, La, Ca and mixtures thereof, said oxygen-ion conducting fluorite is selected from M"O$_2$ wherein M" is M, M' or mixtures thereof, and wherein if Ni is present alone as a dopant without a spinel or a perovskite or fluorite it is present in a concentration of greater than 2.3% by weight and less than 4.4% by weight of said catalyst. Cerium compounds with high oxygen ion-conductivity and storage capacity are most preferred.

Catalyst deactivation due to the presence of sulfur compounds present in the feed remains a challenge for the catalytic reforming of hydrocarbon fuels since these compounds are not easily removed from the feed. Sulfur preferentially reacts with the active metals present in the catalysts to form metal sulfides that are inactive toward reforming reactions.

Several benefits are derived from doping active transition metals into hexaalumina. Similar to the C—H and C—C bond scission reaction, sulfur preferentially reacts with the step edges (low-Miller index surfaces) of active metal crystallites. However, sulfur dissociation on the surface of the catalyst occurs through a multipoint adsorption mechanism. Therefore, the formation of metal sulfides is also facilitated by the presence of ensembles or groups of highly coordinated metallic clusters. By dispersing the active metal crystallites in a mixed-metal oxide that has a strong metal-support interaction; such as hexaalumina, the active metal crystallites are maintained in a state of low coordination that inhibits the sulfur compound dissociation and the formation of inactive metal sulfides. Hexaalumina serves to not only disperse the active metal crystallites, but also provides surrounding stable oxides (Al—O) which also serve to inhibit sulfur adsorption.

Another aspect of this invention is that oxygen moves out of the hexaalumina, perovskite and/or spinel structure by reduction and is reincorporated back into the structure by re oxidation. This process is known as reduction-oxidation or re-dox. A number of supplementary compounds may be introduced into hexaalumina that also undergo reduction-oxidation, or re-dox, cycles. These metals preferably include: Cr, Fe, Mn, V, and Ti. The re-dox process facilitates hydrocarbon conversion and the conversion of sulfur compounds present in the feed to sulfur dioxide (SO$_2$). SO$_2$ is more innocuous than other forms of sulfur and does not adversely suppress catalyst performance.

The formation of inactive metal sulfide phases is further reduced by doping the hexaalumina structure with transition metals that have less stable metal sulfide forms: copper, rhodium, iridium, platinum, palladium, ruthenium and osmium. Doping the hexaalumina structure and/or supporting one or more of these metals on the surface of hexaalumina-type catalysts results in bi-metallic and/or multi-metallic catalysts that are less susceptible to sulfur poisoning. The dispersal of metals in this manner further inhibits sulfur compounds from disassociating on the surface of the catalyst and forming inactive metal sulfides. The hexaalumina catalysts may be prepared in a variety of geometries including: pellets, extrudates, and as coatings on monoliths or other supports as exemplified by the following preparation methods:

Example 1

Preparation of BaNi$_{0.4}$Al$_{11.6}$O$_{18.8}$ by Co-Precipitation from Aqueous Precursors The following preparation procedure is for making 1 kg of BaNi$_{0.4}$Al$_{11.6}$O$_{18.8}$. 150.18 g nickel nitrate were dissolved in water at 60° C. In a separate container 5617.86 g aluminum nitrate were dissolved in water. Similarly, 337.39 g barium nitrate were dissolved in water. The pH of these solutions may be adjusted with nitric acid to enhance solubility (~pH 1). Once the salts were in solution, they were then ad-mixed to form an aggregate solution mixture. The preferred solution temperature is 60° C. and was stirred for 30 minutes to achieve homogeneity.

Following the mixing of the materials, the nitrate solution was then added slowly to a base solution containing 5617.86 g ammonium carbonate, also at 60° C. The pH of the solution was monitored periodically, as a function of nitrate solution addition. The initial pH of the carbonate solution was 8.5. During the course of addition, the pH dropped from ~8.5 to 7.0. This precipitation procedure resulted in precipitating out all the Ba, Ni and Al as carbonates and hydroxides.

The resultant precipitate was then aged for 6 to 8 hours with constant stirring at 60° C. before filtering. The filtrate was then rinsed to remove extraneous nitrate and ammonia. Following rinsing, the filtrate was dried at 110° C. and calcined directly in air for 4 hours at 1300° C. Alternatively, the filtrate was also extruded into pellets and then calcined in a furnace in air at 1300° C. for 4 hours.

Example 2

Preparation of SrNi$_{0.4}$Rh$_{00.1}$Al$_{11.59}$O$_{18.8}$ Catalyst with 0.1 wt % CeO$_2$ Oxygen Ion Conducting Film The following preparation procedure is for making 1 kg of SrNi$_{0.4}$Rh$_{00.1}$Al$_{11.59}$O$_{18.8}$ with a 0.1 wt % CeO$_2$ film. 4.48 g rhodium nitrate were dissolved in water at 60° C. In a separate container 5991.67 g aluminum nitrate were dissolved in water. Similarly, 291.65 g strontium nitrate were dissolved in water. 160.31 g nickel nitrate were also separately dissolved in water. The pH of these solutions may be adjusted with nitric acid to enhance solubility (~pH 1). Once the salts were in solution, they were then ad-mixed to form an aggregate solution mixture. The preferred solution temperature is 60° C. Additionally, 3.19 g (NH$_4$)$_2$Ce(NO$_3$)$_6$ were dissolved in water at 60° C. with pH adjusted to <1 with nitric acid. Once in solution, the Ce was added to the first mixture and was stirred for 30 minutes to achieve homogeneity.

Following the mixing of the materials, the nitrate solution was then added slowly to a base solution containing 5912.81 g ammonium carbonate, also at 60° C. The pH of the solution was monitored periodically, as a function of nitrate solution addition. The initial pH of the carbonate solution was 8.5. During the course of addition, the pH dropped from ~8.5 to 7.0. This precipitation procedure resulted in precipitating out all the Ce, Sr, Ni, Rh and Al as carbonates and hydroxides.

The resultant precipitate was then aged for 6 to 8 hours with constant stirring at 60° C. before filtering. The filtrate was then rinsed to remove extraneous nitrate and ammonia. Following rinsing, the filtrate was dried at 110° C. and calcined directly in air for 2 hours at 1250° C. Alternatively, the filtrate was also extruded into pellets and then calcined in a furnace in air at 1250° C. for 2 hours.

Example 3

Preparation of $SrNi_{0.4}Al_{11.6}O_{18.8}$ by Hydrolysis of Metallo-Isopropoxides The following preparation procedure is for making 1 kg of $SrNi_{0.4}Al_{11.6}O_{18.8}$. 322.77 g aluminum nickel isopropoxide were dissolved in 2-propanol. In a separate vessel 3043.15 g aluminum isopropoxide were dissolved in 2-propanol. Similarly, 471.02 g strontium isopropoxide were dissolved in 2-propanol. These solutions were then admixed and stirred continuously for 30 minutes to achieve homogeneity.

The metal alkoxide solution was then added drop-wise into water at room temperature with constant stirring. The resulting solution was stirred for one additional hour at room temperature before filtering and rinsing. After rinsing the material was dried at 50° C. The dried cake was then and calcined directly in air for 2 hours at 1250° C. Alternatively, the cake was also extruded into pellets and then calcined in a furnace in air at 1250° C. for 2 hours.

Example 4

Preparation of $LaNi_{0.4}Al_{11.6}O_{19.3}$ by Solid-State Granulation

The following preparation procedure is for making 1 kg of $LaNi_{0.4}Al_{11.6}O_{19.3}$. 415.50 g of $La_2O_3$, 38.11 g NiO, and 1508.28 g $Al_2O_3$ were ad-mixed. 300 mL water was added to the solid mixture to promote agglomeration. The material was dried at 110° C. and calcined directly in air for 2 hours at 1300° C.

Example 5

Preparation Procedure for Making a 10 wt % $(BaNi_{0.4}Rh_{0.01}Al_{11.59}O_{18.8})$ Catalyst Supported on a Ba-Hexaaluminate Monolith The following preparation procedure is for making 1 kg of $BaNi_{0.4}Rh_{0.01}Al_{11.59}O_{18.8}$. Corresponding hydroxides or carbonates are dispersed in a solution containing nitric acid and 5 wt % polyvinyl alcohol. The pH of the solution is maintained at 2. The monolith is then dip coated into the solution and drawn out at a uniform rate.

Example 6

The aqueous method of Examples 1 and 2 were used to make a 5 wt % $MgRh_2O_4/BaAl_{12}O_{19}$ catalyst.

Example 7

The aqueous method of Examples 1 and 2 were used to make 1 Kg of $LaMg_{0.9}Ir_{0.1}Al_{11}O_{19}$.

Example 8

The aqueous method of Examples 1 and 2 were used to make 1 Kg of $BaCr_{0.6}Ni_{0.4}Al$ $$F_{N2,i} = F_{N2,o} \quad (1)$$

$$F_{T,i} = \text{Total Feed Molar Flow} = \frac{F_{N2,i}}{[N_2]i} \quad (2)$$

$$F_{T,o} = \text{Total Exit Molar Flow} = \frac{F_{N2,o}}{[N_2]_o} \quad (3)$$

$$H_2 \text{ Yield} = \frac{\text{mol } H_2}{\text{Mol Fuel}} = \frac{[H_2] F_{T,o}}{[C_{14}H_{30}] F_{T,i}} \quad (4)$$

$$CO \text{ Selectivity (\%)} = \frac{\text{mol CO (100)}}{\text{mol C}} = \frac{[CO] F_{T,o} (100)}{14[C_{14}H_{30}] F_{T,i}} \quad (5)$$

TABLE 1

Partial Oxidation Performance of Hexaaluminate Catalyst on n-tetradecane*

| Catalyst | Promoter | H2 Yield [mol H2/mol fuel] | CO Selectivity (%) |
|---|---|---|---|
| $SrNi_{0.4}Al_{11.6}O_{18.8}$ | 0.1. wt % Rh | 11.76 | 76.2 |
| $SrNi_{0.4}Al_{11.6}O_{18.8}$ | — | 11.25 | 75.9 |
| $BaNi_{0.4}Al_{11.6}O_{18.8}$ | — | 10.74 | 72.9 |
| $LaNi_{0.4}Al_{11.6}O_{19.3}$ | — | 9.33 | 58.4 |
| $LaCo_{0.4}Al_{11.6}O_{19.3}$ | — | 9.04 | 56.5 |
| $LaCo_{0.4}Al_{11.6}O_{19.3}$ | — | 11.33 | 77.6 |

*GHSV = 50,000 cm$^3$/g/h, Temp = 850° C., P = 2 atm, O/C = 1.2

Figure 4:
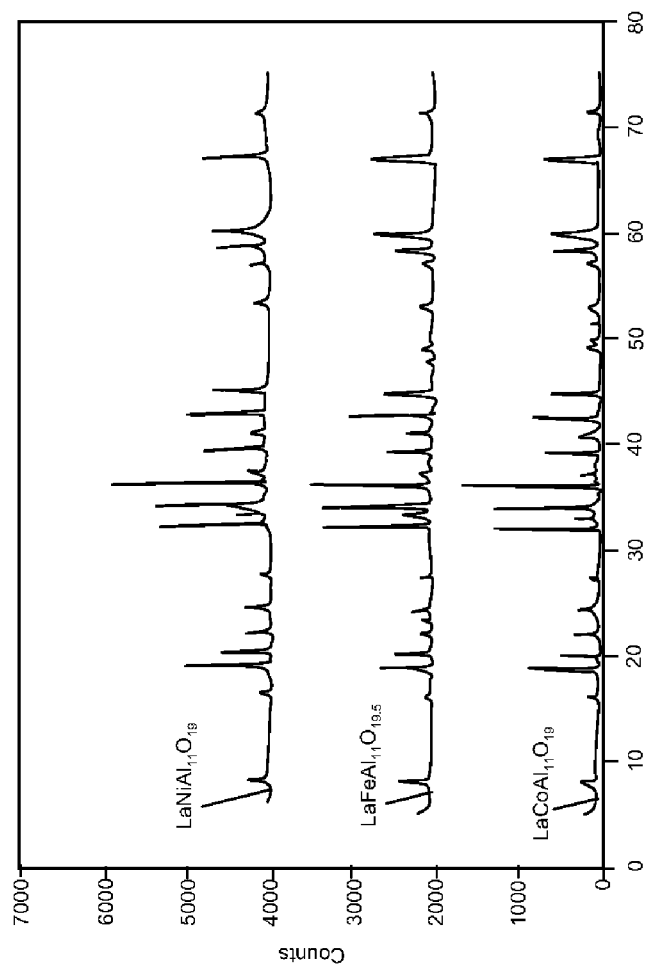
FIG. 4 is a graphical representation of the x-ray of materials produced in accordance with the method of present invention showing the crystal structure of three different embodiments by x-ray chromatography.
Figure 5:
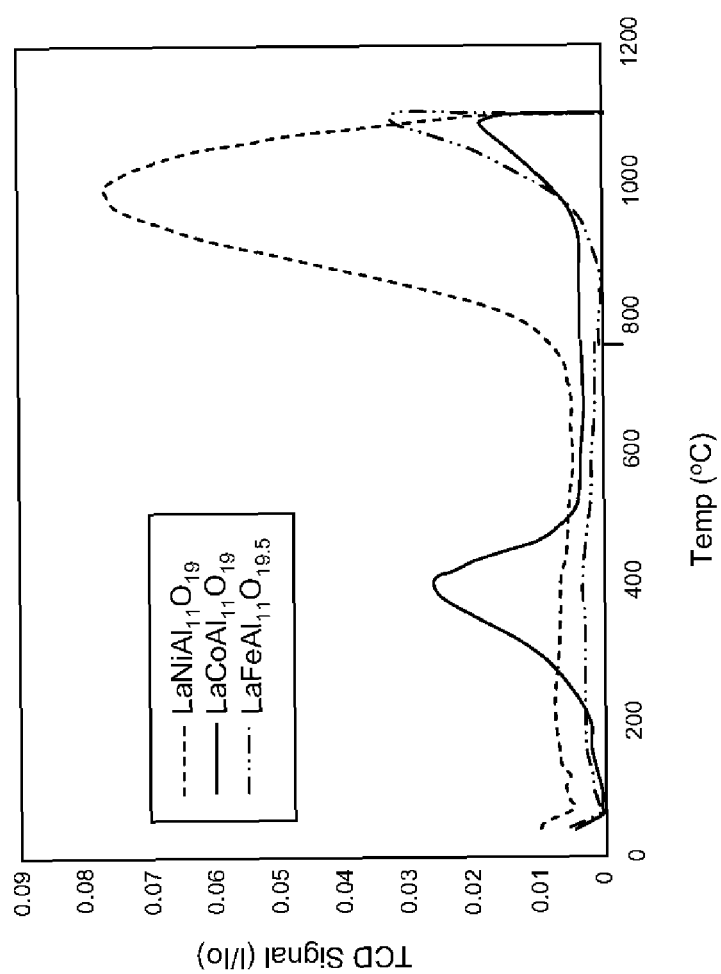
FIG. 5 is a graphical representation showing the $H_2$ consumption as a function of temperature for three different representative samples of the present invention.

The catalytic hydrogen yields and carbon monoxide selectivities of hexaaluminate-type catalysts may be calculated based on the definitions provided in equations (1) through (5). Table 1 is a compilation of hydrogen yields and carbon monoxide selectivities for n-tetradecane partial oxidation over various hexaaluminate-type catalysts. Table 2 is a compilation of hydrogen yields and carbon monoxide selectivities for n-tetradecane partial oxidation where the fuel contains 50 ppm w/w sulfur as dibenzothiophene over various hexaaluminate-type catalysts X-ray diffraction patterns for cobalt, iron and nickel doped hexaalumina are shown in FIG. 4. All three catalysts show hexaaluminate-type catalyst structure without the presence of the corresponding cobalt, iron or nickel oxides. FIG. 5 shows the temperature programmed reduction profile for cobalt, iron and nickel doped hexaalumina in 5 vol % $H_2$/Ar. The reduction peaks for these elements doped in hexaalumina are shifted to significantly higher temperatures indicating that there are significantly greater interactions between the metal and the support and that the metals are well dispersed. This is a key property in preventing sintering and vaporization of active metals.

Referring now to FIG. 1, there is shown a schematic drawing of the crystal structure of the hexaaluminate of the present invention. As seen, there is disclosed the A and B sites which are substituted as herein set forth as well as the B sites and also the materials in the crystal structure of the hexaaluminum oxide which spreads the active metals which ameliorates both carbon formation and also make the hexaaluminate more sulfur tolerant.

Figure 2:
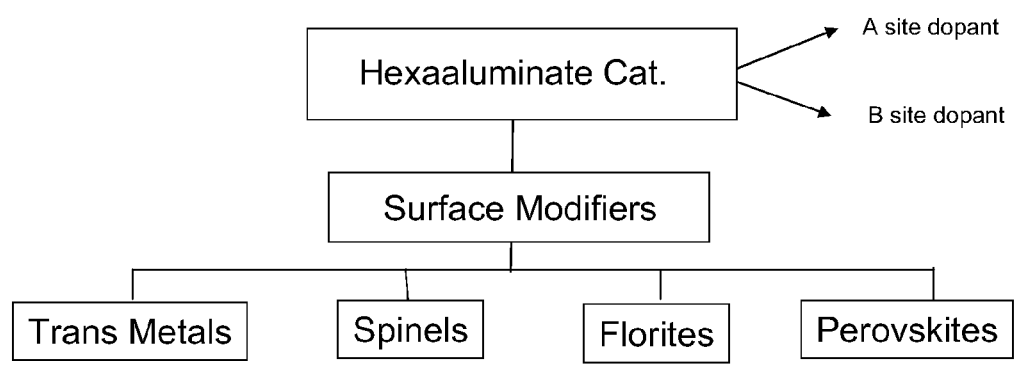
FIG. 2 is a representation of the invention showing the various constituents thereof.

FIG. 2 shows by way of a flow diagram the invention in an easy to understand flow chart. The hexaaluminate catalyst as shown in FIG. 2 has both A and B sites and also surface modifiers. The surface modifiers may be one or more of the transition metals, the spinels or oxygen ion conductors. The oxygen ion conductors are selected from fluorides and perovskites. As shown, the A site may be selected from the alkali metals, the alkaline earth metals, the lanthanide metals or combinations thereof. Preferably, the A site is selected from an alkaline earth metal, a lanthanide metal and mixtures thereof and more preferably, and most preferably the A site is selected from Ba, a combination of Sr and La and mixtures thereof. The A site substitution functions to cause the active metals to be separated thereby reducing coke formation and making the catalyst more tolerant to sulfur.

The B site dopant is selected from, in general, the transition metals or mixtures thereof. More particularly, the B site is preferably selected from Co, Cu, Fe, Ni, Rh, Ru, Pt, Pd, Os, Re, Mn Ce, Ti, Ag, Au and mixtures thereof. More preferably, the B site is selected from Rh, Ni, Pt, Co, Fe, Pd and mixtures thereof. The dopants may be selected from Ca, Cs, K, La, Sr, Ba, Li, Mg, Ce, Co, Fe, Ir, Rh, Ni, Ru, Cu, Pt, Os, Pd, Cr, Mn, W, Re, Sn, Gd, V, Ti, Ag, Au and mixtures thereof. The surface modifiers may be selected from any of the active transition metals, the identified spinels or oxygen-ion conductors, the oxygen-ion conductors being selected from either fluorites or perovskites as hereinbefore described. Preferably, the spinels are selected from $MRh_2O_4$, $MPt_2O_4$, $MPd_2O_4$, $MIr_2O_4$, $MRu_2O_4$ wherein M=Mg, Sr, Ba, La, Ca and mixtures thereof, the fluorites are selected from oxygen-ion conducting $M''O_2$, where M'' is M and/or M'; and the perovskites are selected from $M'RhO_3$, $M'PtO_3$, $M'PdO_3$, $M'IrO_3$ $M'RuO_3$ wherein M'=Mg, Sr, Ba, La, Ca and mixtures thereof.

As stated previously, where Ni is used along as a dopant without a spinel or an oxygen-ion conductor, the Ni concentration is between 2.3% and 4.4% by weight of the catalyst.

As set forth in the Examples, there are a variety of methods which may be employed to manufacture the metal substituted hexaaluminate catalyst of the present invention. These methods include forming an aqueous nitrate solution of the catalyst constituents containing Al ions in an acidic environment, adjusting the acidic environment to a pH sufficient to precipitate the constituents, filtering and rinsing the precipitated constituents to remove extraneous liquid and thereafter calcining the precipitate for a time and at a temperature sufficient to produce the catalyst or forming a metallo-isopropoxide of the desired constituents and adding same to water followed by rinsing and drying to form a cake and calcining the cake at a temperature and for a time sufficient to form the catalyst or forming a mixture of the constituent oxides followed by addition of water followed by drying and calcining oxides at a temperature and for a time sufficient to form the catalyst.

Figure 6A:
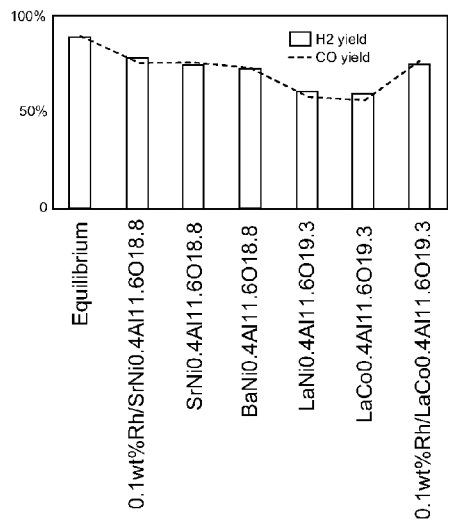
FIG. 6a gives the reforming efficiency of representative samples of the reforming catalyst prepared in accordance with the method of the present invention, with n-tetradecane used as the model compound.

FIG. 6A is bar graph showing the efficiency of the hydrogen yield and carbon monoxide yield for a wide variety of the catalyst. For instance, the first bar graph relates to a catalyst of the present invention in which 0.1 weight percent Rh is used as a surface modifier with Sr being provided as an A site dopant and $Ni_{0.4}$ being provided as a B site dopant. The next bar in FIG. 6A shows a Sr A site dopant and the Ni B site dopant without the use of the Rh surface modifier. The next bar graph is a Ba A site dopant and a Ni B site dopant.

The following bar is for a La A site dopant and a $CO_{0.4}$ B site dopant and finally in FIG. 6A is a 0.1 weight percent Rh surface modifier with a La A site dopant and a $CO_{0.4}$ B site dopant.

Figure 6B:
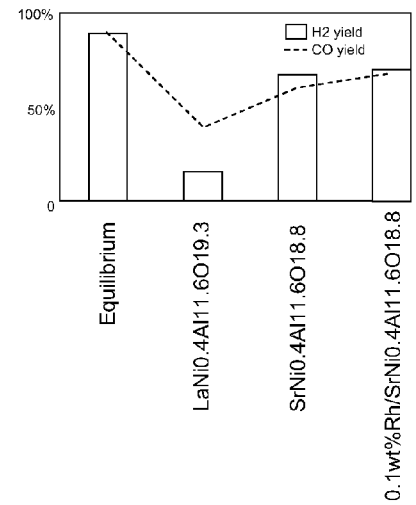
FIG. 6b gives the reforming efficiency of representative samples of the reforming catalyst prepared in accordance with the method of the present invention, with n-tetradecane mixed with 50 ppm w/w S dibenzothiophene used as the model compound.

All of these efficiencies are for as indicated in FIG. 6A a fuel of n-tetradecane. FIG. 6B is for the combination of n-tetradecane and dibenzothiophene with 50 ppm w/w S contaminate.

Figure 7:
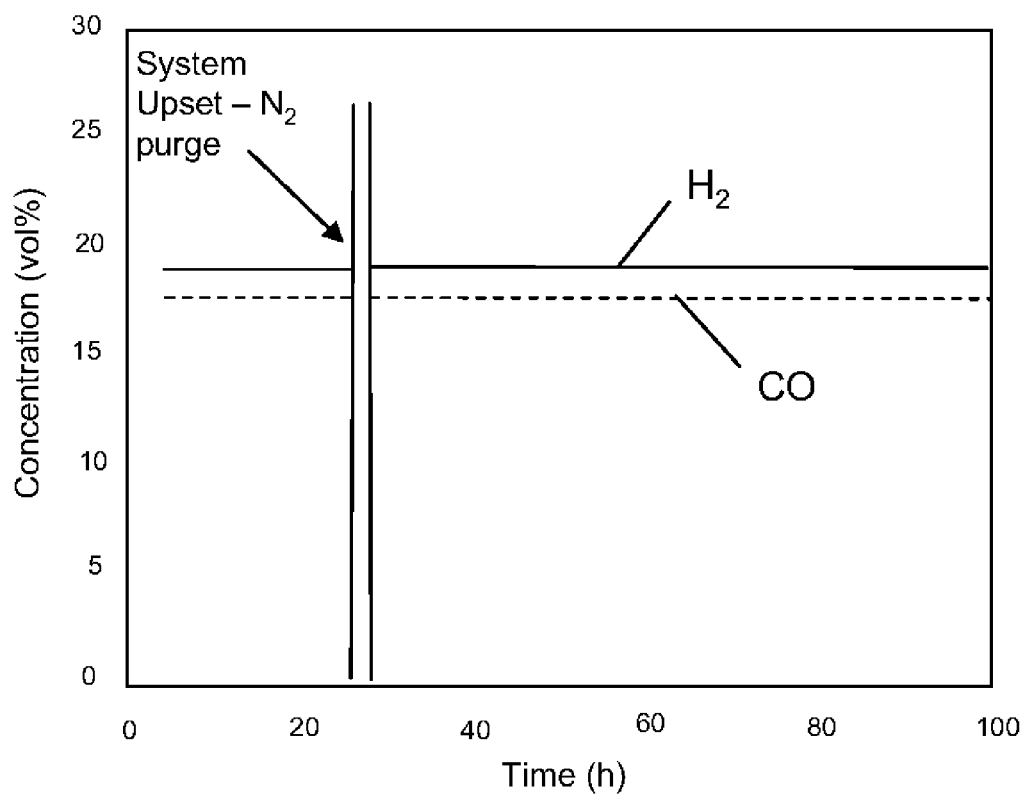
FIG. 7 is a graphical representation of the concentration in volume percent of hydrogen and carbon monoxide produced by the catalyst of the present invention for over a period of 100 hours.
Figure 8:
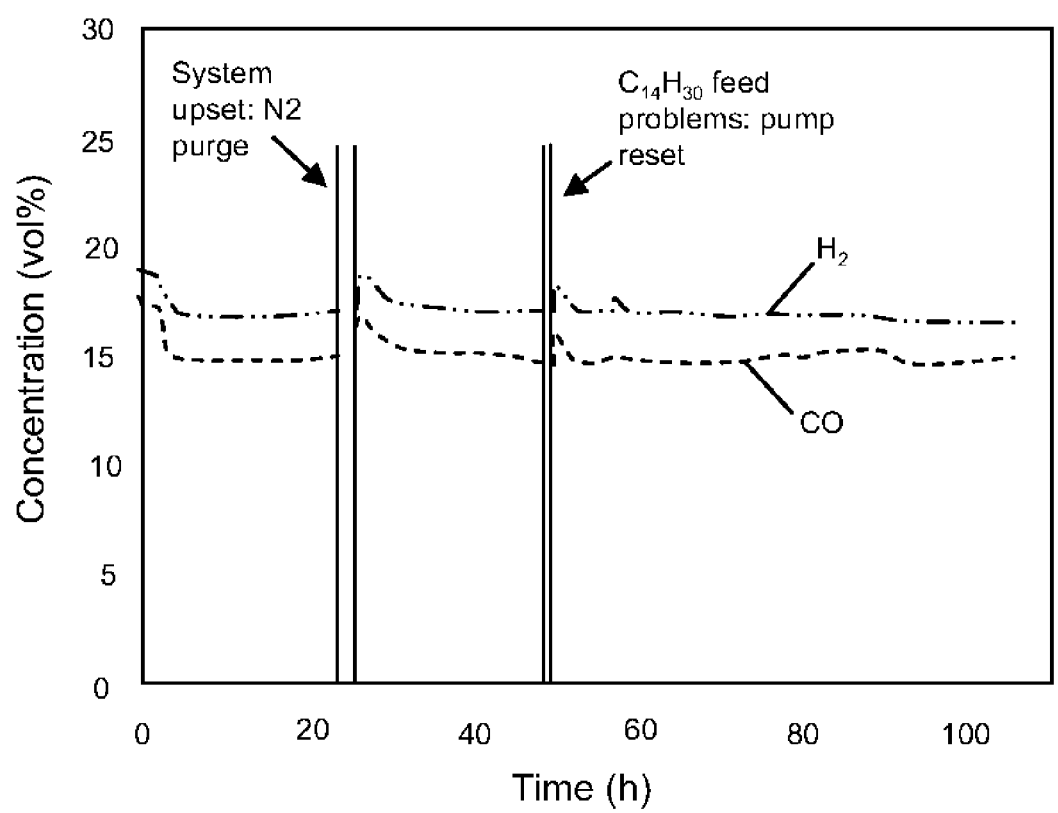
FIG. 8 is a graphical representation like FIG. 7 for a different catalyst with a mixture of n-tetradecane mixed with 50 ppm w/w S dibenzothiophene.

FIGS. 7 and 8 taken together show the very good stability as stated in the presence of sulfur or with or without sulfur with over 100 hours of operation with very little decline in efficiency.

Figure 3:
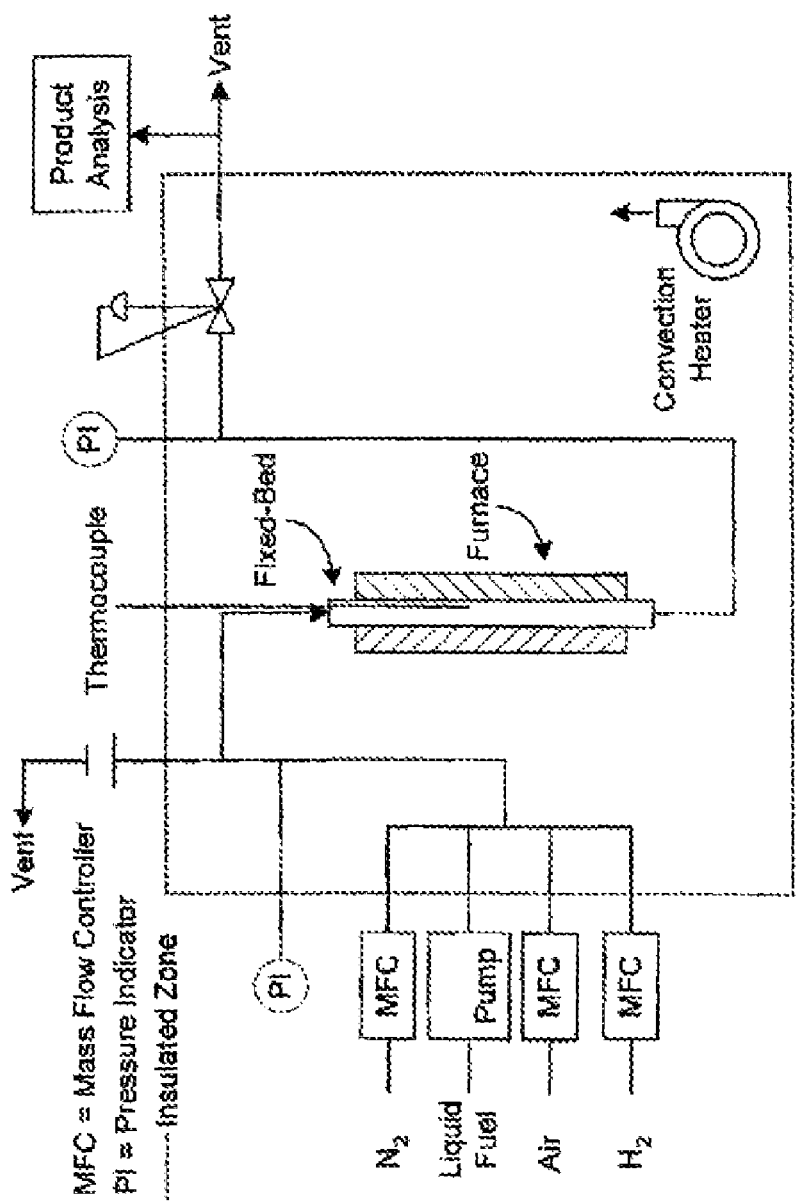
FIG. 3 is a line drawing representation of the experimental set-up used to perform the experiments reported in this application.

As seen therefore, there has been provided an important advance in catalysts for reforming of hydrocarbon fuels. Reforming operations utilizing the described fuels are well known and include contacting the catalyst in a variety of different systems in which the hydrocarbon containing fuel is brought into contact with the catalysts of the subject invention in reforming conditions which are well known. FIG. 3 shows the laboratory setup for the subject invention for accumulating the data set forth herein and is shown that a nitrogen and liquid fuel air and hydrogen are introduced into a manifold by a metering pump or mass flow controller. The metering pump used for the liquid fuel was a liquid high performance chromatography pump, well known in the field as is the pressure indicator and other aspects of the flow chart which shows the equipment used. A thermocouple was positioned within the fixed bed so as to give temperature readings thereof in the furnace can be wire wraps or other common heating devices used in the chemical engineering arts. Various valves and pumps are used all as well known in the art.

FIG. 7 represents a 100 hour test conducted on n-tetradecane that showed excellent carbon formation resistance to n-tetradecane, a coking prone fuel. FIG. 8 represents a 100 hour test conducted on a mixture of n-tetradecane and dibenzothiophene (50 ppm w/w sulfur). The hexaaluminate catalyst exhibited good stability in the presence of sulfur and n-tetradecane.

While the invention has been particularly shown and described with reference to a preferred embodiment hereof, it will be understood by those skilled in the art that several changes in form and detail may be made without departing from the spirit and scope of the invention The embodiments of the invention in which an exclusive property or privilege is claimed are defined as follows:

1. A method of producing a hydrogen-rich product stream using a catalyst consisting of a metal substituted hexaaluminate for reforming hydrocarbon fuels, comprising:

contacting a feed stream and said catalyst in a catalyst zone under a temperature condition sufficient for at least one reforming reaction, where the at least one reforming reaction is steam reforming, autothermal reforming, or partial oxidation, and where the feed stream is comprised of hydrocarbons and an oxygen-containing oxidant gas, and where the feed stream has an $O_2$ to C ratio less than the stoichiometric amount of oxygen necessary to oxidize all the carbon in the feed stream to $CO_2$, and where the metal substituted hexaaluminate is a hexaaluminate having the composition $AB_yAl_{12-y}O_{19-\delta}$ where, A occupies the A-site of the metal substituted hexaaluminate and A is comprised of a primary A component, where the primary A component is an alkali metal, an alkaline earth metal, or a lanthanide metal, and where A may be further comprised of an A-site dopant, where the A-site dopant is an alkali metal, an alkaline earth metal, or a lanthanide metal, where the primary A component and the A-site dopant are different elements, and where the molar quantity of the A-site dopant in the $AB_yAl_{12-y}O_{19-\delta}$ composition is less than or equal to the molar quantity of the primary A component in the $AB_yAl_{12-y}O_{19-\delta}$ composition, B occupies the B-site of the metal substituted hexaaluminate and B is comprised of a primary B component and a B-site dopant, where the primary B component is Co, Fe, Rh, Ni, Ru, Cu, Pt, Os, Pd, Re, Ti, or Ag, and where the B-site dopant is Fe, Ir, Rh, Ni, Ru, Cu, Pt, Os, Pd, Cr, Re, V, Ti, or Ag, where $0<y\leq3$ and where the primary B component and the B-site dopant are different elements, and where the molar quantity of the B-site dopant in the $AB_yAl_{12-y}O_{19-\delta}$ composition is greater than zero and less than or equal to the molar quantity of the primary B component in the $AB_yAl_{12-y}O_{19-\delta}$ composition, and where if Ni is the primary B component or the B-site dopant, Ni is present in a concentration greater than 2.3 weight percent of the metal substituted hexaaluminate and less than 4.4 weight percent of the metal substituted hexaaluminate, $\delta$ is a number rendering the composition charge neutral; and withdrawing the hydrogen-rich product stream from the catalyst zone, where a majority of hydrogen in the hydrogen-rich product stream exists as $H_2$, thereby producing the hydrogen-rich product stream using the metal substituted hexaaluminate as said catalyst for reforming hydrocarbon fuels.

2. The method of claim 1 where the primary A component is Cs, La, Sr, or Ba.

3. The method of claim 2 where the primary B component is Co, Fe, Ni, Rh, Pt, or Pd, and where the B-site dopant is Co, Fe, Ni, Rh, Pt, or Pd.

* * * * *